US006130405A

United States Patent [19]
Loringer

[11] Patent Number: 6,130,405
[45] Date of Patent: Oct. 10, 2000

[54] LASER DRILLING HOLES IN A CYLINDRICAL WORKPIECE

[75] Inventor: Gary Loringer, Stuart, Fla.

[73] Assignee: Chromalloy Gas Turbine Corporation, San Antonio, Tex.

[21] Appl. No.: 09/151,648

[22] Filed: Sep. 10, 1998

[51] Int. Cl.[7] .......................... B23K 26/00; B23K 26/04
[52] U.S. Cl. ................................ 219/121.71; 219/121.81
[58] Field of Search ......................... 219/121.7, 121.71, 219/121.82, 121.83, 121.76, 121.81

[56] References Cited

U.S. PATENT DOCUMENTS

| | | |
|---|---|---|
| 3,596,050 | 7/1971 | Tikijian . |
| 4,032,743 | 6/1977 | Erbach et al. . |
| 4,298,784 | 11/1981 | Schmall ............................ 219/124.02 |
| 4,377,736 | 3/1983 | Daunt et al. . |
| 4,794,222 | 12/1988 | Funayama et al. ................. 219/121.78 |
| 4,948,940 | 8/1990 | Ruckl ................................. 219/121.68 |
| 5,026,979 | 6/1991 | Ortiz et al. . |
| 5,037,183 | 8/1991 | Gagosz et al. . |
| 5,067,086 | 11/1991 | Yamazaki et al. ................. 364/474.08 |
| 5,083,006 | 1/1992 | Stroud ................................ 219/121.71 |
| 5,117,087 | 5/1992 | Baker et al. ....................... 219/121.71 |
| 5,339,103 | 8/1994 | Schmidt et al. . |
| 5,340,962 | 8/1994 | Schmidt et al. ................... 219/121.78 |
| 5,489,758 | 2/1996 | Nihei et al. ....................... 219/121.63 |

OTHER PUBLICATIONS

VanderWert et al., "Laser drilling effusion cooling holes in low NOx turbine engine components," Proc. of the 1996 ASME Turbo Asia Conference, pp. 1–8, 1996.
"Laserdyne", Jul. 1996, Lumonics Inc.

*Primary Examiner*—Samuel M. Heinrich
*Attorney, Agent, or Firm*—Mitchell D. Bittman

[57] ABSTRACT

A process is provided for laser drilling a plurality of holes in a row around the circumference of a cylindrical workpiece by continuously rotating the workpiece, sequentially impacting each hole location with a laser pulse and repetitively and sequentially impacting each hole location with a subsequent laser pulse to drill through the workpiece.

14 Claims, 2 Drawing Sheets

LASER DRILLING HOLES IN A CYLINDRICAL WORKPIECE

BACKGROUND OF THE INVENTION

This invention relates to a process for laser drilling holes in a cylindrical workpiece, more particularly laser drilling a row of holes while rotating the workpiece.

The laser drilling of holes, particularly when there are many holes to be drilled, can be a time consuming process. Each hole drilled is a discrete operation with adjustment to equipment needed before the next hole is drilled. For example, aircraft engine combustor parts, made from high temperature Ni or Co based alloys, can require tens of thousands of 0.020 inch (0.0508 cm) holes drilled at 20 degrees to the surface, where wall thickness may vary from 0.020 inch (0.0508 cm) to 0.100 inch (0.254 cm). In order to timely complete the entire process operation, monitoring and controlling the formation of each hole needs to be performed quickly. Even when the control and monitoring systems operate in substantially "real-time" as set forth in U.S. Pat. No. 5,026,979 this process is still time consuming.

Further when laser drilling holes into cylindrical workpieces, particularly turbine components such as combustors, these parts are not manufactured perfectly round and when drilling holes at steep angles, eg. 20 degrees as is typically required for these components, any variation in distance of the laser nozzle from the component surface can not only affect the laser focus and hole size, but position the hole incorrectly in the component.

Thus it becomes an object of this invention to provide a process for laser drilling holes in a cylindrical workpiece in a fast and accurate manner.

SUMMARY

Briefly, this invention provides a process for laser drilling with a pulsed laser beam a plurality of holes in a row around the circumference of a cylindrical workpiece wherein each hole requires a plurality of laser pulses to drill the hole comprising: continuously rotating the cylindrical workpiece about its central axis; synchronizing the speed of rotation of the workpiece with the pulse frequency of the laser and sequentially impacting a single laser pulse at each hole location; and repetitively and sequentially impacting each hole location with a subsequent laser pulse until the holes are drilled through the workpiece. Preferably, particularly when holes are being drilled at an angle, during laser drilling the distance from the laser drilling nozzle to the surface is monitored and adjusted to maintain a constant predetermined distance.

DETAILED DESCRIPTION OF THE INVENTION

A process is provided for drilling a plurality of holes in a row around the circumference of a cylindrical workpiece, such workpieces requiring a plurality of laser pulses to drill a hole. Suitable cylindrical workpieces include turbine components, such as combustors and afterburners. Typically such turbine components require a hole diameter of about 0.01 to 0.03 inches with a spacing between holes of about 0.1 to 0.5 inches and generally have a material thickness of 0.01 to 0.10 inches. A typical combustor is constructed of high temperature nickel based alloy and may have a diameter of 18 inches with 275 equally spaced holes in an individual row around the circumference, with a series of 45 rows on its cylindrical body. Other materials can also be suitably laser drilled by this process including Ni, Co, Fe or Ti based alloys.

The laser drilling is carried out with a pulsed laser beam. A suitable laser is a Nd:YAG laser. This laser can be operated for example at 125 to 130 watts and 10–30 joules/pulse to effectively drill holes. The pulses can repeat at the frequency of 3 to 20/second.

Figure 1:
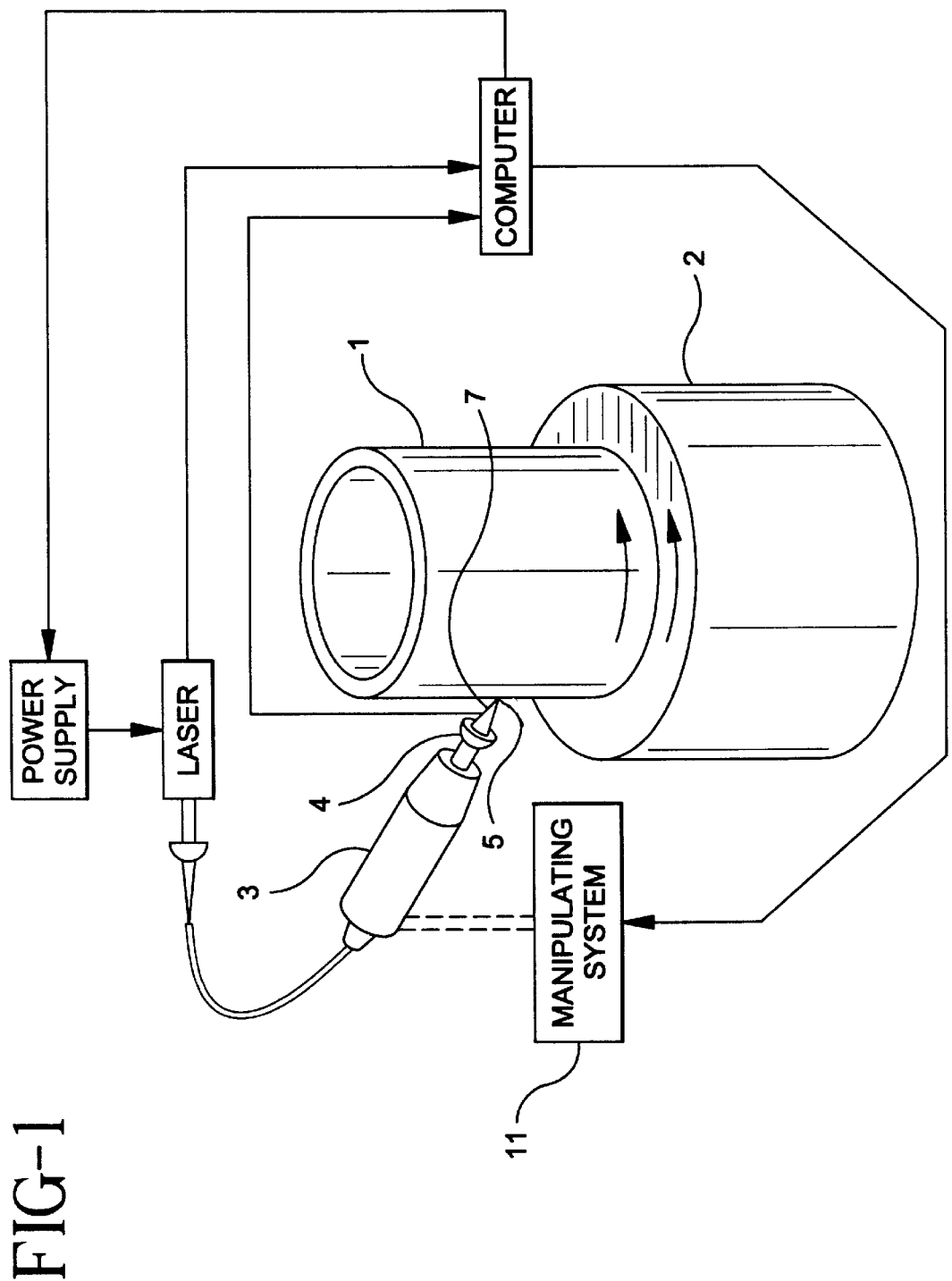
FIG. 1 is a schematic illustration of the laser drilling arrangement.

As shown in FIG. 1 the workpiece 1 is mounted on a rotary platform 2 with the workpiece being rotated about its central axis. The speed of rotation of the workpiece (ie. the surface speed) is synchronized and coordinated with the frequency of the laser pulses of the laser 3 so that a single laser pulse will sequentially impact the workpiece surface at each hole location. Typical surface speeds of the rotating workpiece can be from 3 to 120 preferably 60 to 80 inches/minute and computer software can synchronize the speed of the rotary table 2 with the pulse frequency of the laser 3. As the table is rotated, the laser will shoot an individual pulse at each degree increment where a hole is located.

After a single laser pulse has impacted a hole location, the laser drilling is continued to repetitively and sequentially impact each hole location with a subsequent laser pulse. A multiple of revolutions of the workpiece are required before the hole is completely drilled through the material, typically 2 to 5 revolutions with a corresponding laser pulse for each revolution. For example a 0.080 inch thick material drilled at a 20 degree angle may require 3 to 4 revolutions to produce the row of holes.

An important factor in laser drilling the holes is monitoring and adjusting the distance of the laser drilling nozzle to the workpiece simultaneously with laser drilling to maintain a constant predetermined distance between the laser drilling nozzle 4 and the surface of the cylindrical workpiece 5. Because workpieces such as sheetmetal fabricated parts, cannot be manufactured perfectly round, the distance of the nozzle to the surface can vary as the part rotates. When the hole is at an angle of 90 degrees to the surface the varying distance will affect the hole size, but when the hole is at an angle, eg. a steep angle of 15 to 25 degrees as required in turbine engine component designs, the varying nozzle to surface distance will also significantly affect the position accuracy of the hole. For example, at a hole angle of 20 degrees varying the nozzle distance by 0.02 inches could place the hole 0.10 inches away from its desired location.

A sensor 7 associated with the nozzle 4 is used to determine the distance between the laser nozzle and the surface of the workpiece. The sensor can be of different types such as an optical, inductive or capacitance sensor. An electronic means in the form of a microprocessor (computer) calculates the distance measured and compares with a set value and according to the difference between this set value and the measured value a signal is sent to the nozzle control positioning apparatus (manipulating system) 11 to move the nozzle to the correct distance from the workpiece surface. A suitable nozzle control apparatus is shown in U.S. Pat. No. 5,340,962. This monitoring and adjustment is carried out continuously and simultaneously with laser drilling to maintain a constant predetermined distance. Various sensors which measure distances are shown in U.S. Pat. Nos. 3,596,050, 4,298,784, 4,794,222, and 4,948,940.

Figure 2:
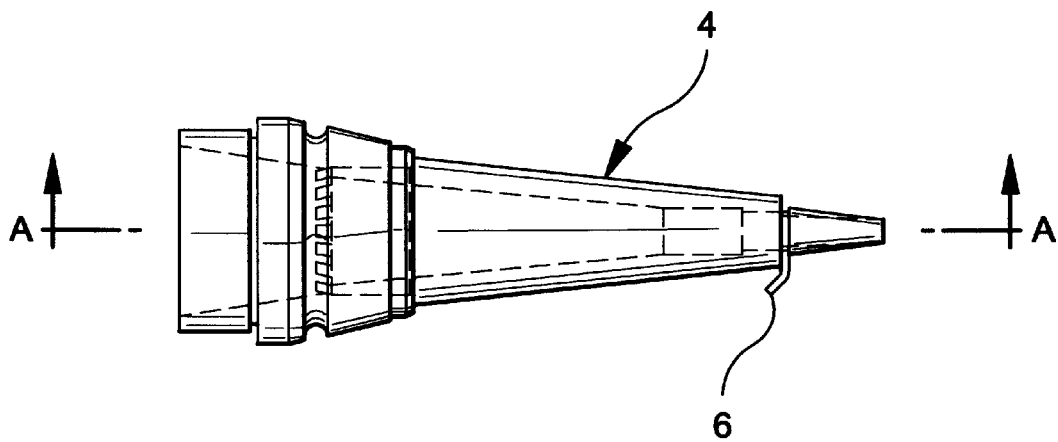
FIG. 2 is a side view of a laser drilling nozzle.
Figure 3:
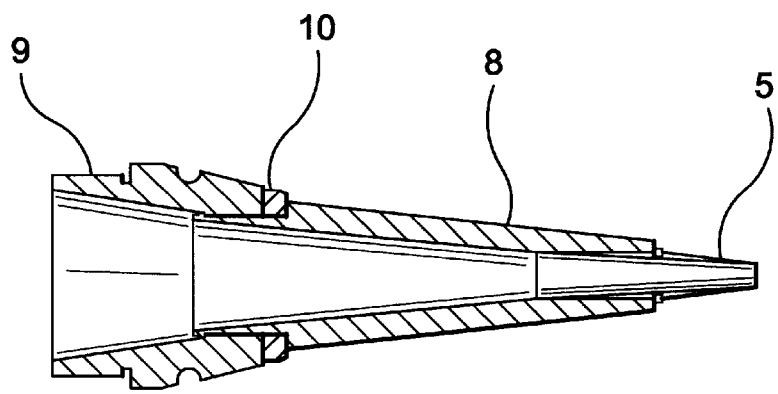
FIG. 3 is a cross sectional view of the nozzle of FIG. 2 taken along line A—A.

In one embodiment of this invention a capacitance sensor is utilized. In this embodiment a nozzle 4 as illustrated in FIGS. 2 and 3 is utilized. This nozzle comprises a nozzle tip 5 which is made of a conductive material, preferably copper, for use in the capacitance measurement. Nozzle clip 6 connects the nozzle to the sensor system 7, as shown in FIG. 1. The nozzle body 8 is of an insulator material to insulate the nozzle tip 5 to provide accurate capacitance measurements between nozzle tip and workpiece surface. The insulator is typically ceramic or other non flammable insulating material such as triflouroethylene. The nozzle body 8 is attached to the nozzle adapter 9. The nozzle has also been designed with a locking ring 10 to facilitate adjustment of the nozzle over a broad range of drilling angles.

By the process of this invention a row of holes can be placed around the circumference in a time saving manner. Prior art processes where holes are discreetly drilled may require 12 seconds per hole, while for this process a row of holes can be drilled at a rate of 2–3 holes/second. This can translate for row of 270 holes to 2 minutes per row of holes verses prior art of 53 minutes per row of holes. This time savings is then multiplied by the number of rows required in a workpiece.

EXAMPLE

An Allied Signal outer liner of a combustor having a diameter of 10.6 inches and constructed of AMS 5608 (Haynes 188) alloy having a material thickness of 0.030 inches is placed on a rotary table as shown in FIG. 1 set to rotate at a surface speed of 60 inches/minute. A Nd:YAG Laser is set at a power of 140 watts, a pulse width of 1.5 m/s and a frequency of 5 pulses/second. The distance of the tip of the laser nozzle to the combustor surface is maintained at 0.10 inches by use of a capacitance sensor with the nozzle and systems shown in FIGS. 2 and 3. The laser control system is further described in U.S. Pat. Nos. 5,339,103 and 5,340,962.

Laser drilling is carried out to drill holes at 17 degrees to the surface the holes having a 0.020 average diameter with 180 holes/row around the circumference of the combustor and twenty rows of holes are drilled into the combustor. Each row takes approximately two revolutions to produce a row of holes and each row takes about one minute to drill.

What is claimed:

1. A process for laser drilling with a pulsed laser beam a plurality of holes arranged in a row around the circumference of a cylindrical workpiece, wherein each hole requires a plurality of laser pulses for the drilling thereof comprising:
   continuously rotating the cylindrical workpiece about its central axis from commencement to completion of the drilling of all of the holes in the row;
   synchronizing the speed of rotation of the workpiece with the pulse frequency of the laser beam and sequentially impacting a single laser pulse at each hole location;
   repetitively and sequentially impacting each hole location with a subsequent laser pulse until all of the holes in the row are drilled through the workpiece;
   and monitoring and adjusting the distance of a laser drilling nozzle to the workpiece surface simultaneously with laser drilling to maintain a constant predetermined distance.

2. Process of claim 1 wherein the holes are drilled at a non-perpendicular angle to the surface of the workpiece.

3. Process of claim 2 wherein the holes are drilled at an angle of 15 to 25 degrees to the surface of the workpiece.

4. Process of claim 3 wherein the workpiece is a turbine component.

5. Process of claim 4 wherein the distance of the nozzle to the workpiece surface is measured with a capacitance sensor.

6. Process of claim 5 wherein the nozzle has a tip of conductive material to be used in capacitance measurement.

7. Process of claim 6 wherein the nozzle tip is insulated from the nozzle body.

8. Process of claim 7 wherein the nozzle tip is copper.

9. Process of claim 4 wherein adjacent holes are spaced from about 0.1 to 0.5 inches apart.

10. Process of claim 4 wherein the component thickness is from 0.01 to 0.10 inches.

11. Process of claim 4 wherein the hole diameter is from about 0.01 to 0.03 inches.

12. Process of claim 10 wherein 2 to 5 laser pulses are impacted at each hole location to drill through the turbine component.

13. Process of claim 4 wherein the turbine component is a combustor.

14. Process of claim 4 wherein the component is rotated at a surface speed of 30 to 120 inches/minute and the laser pulse is repeated at a frequency of 3 to 20 pulses/second.

\* \* \* \* \*